Figure 1:
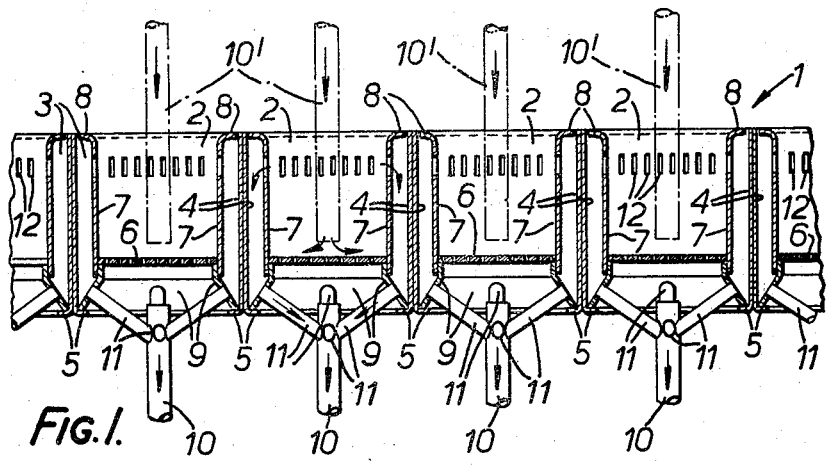

United States Patent [19]

Aldridge

[11] 4,311,564

[45] Jan. 19, 1982

[54] DISTILLATION PROCESS AND APPARATUS FOR A BARGE-MOUNTED PLANT

[75] Inventor: Dennis R. Aldridge, Bromley, England

[73] Assignee: Davy McKee (Oil & Chemicals) Limited, London, England

[21] Appl. No.: 157,244

[22] Filed: Jun. 6, 1980

[30] Foreign Application Priority Data

Jun. 8, 1979 [GB] United Kingdom ............ 20107/79

[51] Int. Cl.³ .................... B01D 3/20; B01D 3/22
[52] U.S. Cl. ............................... 203/99; 202/158; 203/DIG. 24; 261/114 R; 261/114 A; 261/114 JP; 261/114 VT; 261/114 TC
[58] Field of Search ......... 261/114 R, 114 A, 114 JP, 261/114 TC, 114 VT; 202/158, 270; 203/86, 99, DIG. 22, DIG. 24

[56] References Cited

U.S. PATENT DOCUMENTS

| 2,646,977 | 7/1953 | Kraft | 261/114 R |
| 3,105,105 | 9/1963 | Kittel | 261/114 JP |
| 3,338,566 | 8/1967 | Kittel | 261/114 R |
| 3,345,046 | 10/1967 | Versluys et al. | 261/114 R |
| 3,618,913 | 11/1971 | Schramm | 261/114 VT |
| 3,822,869 | 7/1974 | Van Kleef | 261/114 R |
| 4,060,399 | 11/1977 | Gleason | 261/114 R X |
| 4,065,528 | 12/1977 | Slobodyanik | 202/158 X |
| 4,129,626 | 12/1978 | Mellbom | 261/114 JP |
| 4,151,232 | 4/1979 | Slobodyanik | 202/158 X |

FOREIGN PATENT DOCUMENTS

| 822085 | 11/1951 | Fed. Rep. of Germany . |
| 1269047 | 6/1961 | France . |
| 2094430 | 2/1972 | France . |
| 2354128 | 1/1978 | France . |
| 961442 | 6/1964 | United Kingdom . |
| 1520863 | 8/1978 | United Kingdom . |

Primary Examiner—Richard L. Chiesa
Attorney, Agent, or Firm—Bernard, Rothwell & Brown

[57] ABSTRACT

A distillation tray is described which is suitable for use in a distillation column of a barge-mounted plant. This distillation tray is provided with a plurality of cup-like cavities, each cavity having an apertured bottom for upward passage of vapor and being provided with respective weir means and downpipe means for feeding excess liquid to the tray below. In use of such a distillation tray a body of liquid can be maintained in each cavity for contact with the upflowing vapor and for providing a liquid seal between stages despite tilting of the tray. Each cavity can be provided by an insert comprising an apertured bottom plate, upstanding walls defining together with the bottom plate a cup-like cavity, at least one of the walls being provided with weir means for overflow of excess liquid from the cavity and downpipe means mounted below the bottom plate for transferring excess liquid that has overflowed the weir means to the tray below.

19 Claims, 2 Drawing Figures

U.S. Patent    Jan. 19, 1982    4,311,564

DISTILLATION PROCESS AND APPARATUS FOR A BARGE-MOUNTED PLANT

This invention relates to distillation. More particularly it relates to a novel distillation process, a novel type distillation tray, a novel type of insert for use therewith, and novel distillation columns incorporating such a tray and/or insert.

Distillation is frequently effected in bubble distillation columns or towers provided with a plurality of trays vertically spaced one from another and provided with so-called bubble caps. Each of these trays comprises a substantially horizontal plate extending across the column and having a plurality of apertures therein. Each of these apertures is provided with a short, vertical, upwardly extending nipple or vapour nozzle which is covered by a bell-shaped cap. Vapour rises from the tray below through the nipples, is diverted downwardly by the caps and bubbles out through serrations in the edge of cap or through slots in the side thereof. A layer of liquid is maintained on the plate by means of an overflow or downpipe to a depth such that the serrations or slots are submerged. The downpipe dips below the liquid level on the tray below so that vapour cannot enter the downpipe and bypass the first-mentioned tray.

An alternative common type of distillation column is the so-called sieve-plate column. Instead of bubble-cap plates, these have flat plates with a large number of relatively small perforations, usually from about 5 mm to about 6.5 mm in diameter on centres about 25 mm to about 50 mm apart. The velocity of vapour rising through these holes is sufficient to prevent the liquid from running down the holes. As with the bubble-cap columns downpipes are provided to convey liquid from one plate to the next one below it.

Bubble-cap and sieve plate columns are perfectly satisfactory for shore-mounted distillation columns. However, they are not suitable for barge-mounted plants, which may be subjected to the motion of sea waves. Any tilting of the column will cause the liquid on the trays to surge to one side of the column, thus giving rise to a grave danger of the vapour seals provided by the liquid on the tray being broken.

The present invention accordingly seeks to provide a distillation process and novel distillation equipment which can be operated satisfactorily even aboard a barge exposed to wave action.

According to the present invention a distillation tray is provided with a plurality of cup-like cavities, each cavity having an apertured bottom from upward passage of vapour and being provided with respective weir means and downpipe means for feeding excess liquid to the tray below, whereby in use a body of liquid can be maintained in each cavity for contact with the upflowing vapour and for providing a liquid seal between stages despite tilting of the tray. Preferably such a distillation tray is constructed from a lattice structure formed with an array of adjacent open-ended cells, each receiving snugly an insert of the type defined below. The cells of such a lattice structure may each have inwardly turned lip means at their lower ends for support of such an insert.

The invention also extends to a distillation column provided with at least one distillation tray as defined in the preceding paragraph.

In accordance with another aspect of the invention there is provided a distillation process which comprises: providing a distillation column having at least one distillation tray divided into a plurality of individual cup-like cavities, each cavity having an apertured bottom and each being provided with weir means and downpipe means for passing excess liquid to the tray below.

allowing liquid to flow into each cavity from the tray above so as to maintain a body of liquid therein;

passing vapour up the column through the apertured bottom of each cavity into the body of liquid therein; and allowing excess liquid to overflow from each cavity to a tray below.

The invention further provides an insert for a distillation tray for a multi-tray distillation column comprising an apertured bottom plate, upstanding walls defining together with the bottom plate a cup-like cavity, at least one of the walls being provided with weir means for overflow of excess liquid from the cavity, and downpipe means mounted below the bottom plate for transferring excess liquid that has overflowed the weir means to the tray below. In a particularly preferred construction the insert is provided with a dependent skirt portion below the bottom plate, which skirt portion may flare outwardly and has the downpipe means mounted thereto. In one form the downpipe means comprises a main vertical downpipe connected at or adjacent its upper end to one or more branch pipes mounted to the skirt portion.

The bottom plate of the insert is apertured; it may, for example, be perforated, as in a conventional sieve-plate construction, or it may be provided with one or more nipples and bubble-caps, as in a conventional bubble-cap column, or with one or more non-return valves, as in a conventional valve tray or ballast tray.

In the practice of the invention the cavities are usually so designed that their transverse dimensions are small in relation to the overall transverse dimensions of the column. This means that the depth of the liquid on the tray in operation may be of the same order of magnitude as the transverse dimensions of the individual cavities. Thus a liquid seal can be maintained in each cavity despite tilting of the tray to an appreciable angle to the horizontal.

Figure 2:
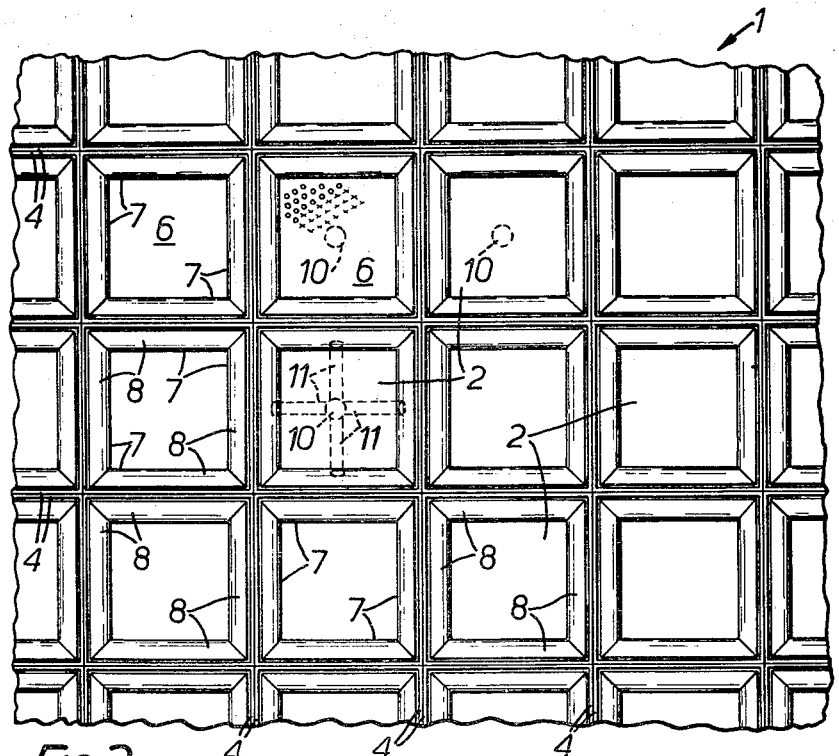

In order that the invention may be clearly understood and readily carried into effect a preferred embodiment thereof will now be described, by way of example only, with reference to the accompanying drawing, wherein:

FIG. 1 is a vertical section through part of a distillation tray in accordance with the invention; and FIG. 2 is a plan view of the distillation tray of FIG. 1.

Referring to the drawing, a distillation tray 1 (only part of which is shown in the drawing) comprises a plurality of tray inserts 2 supported in a horizontally extending grill structure formed by welding together individual cell units 3, each containing a corresponding insert 2. Each cell unit 3 is formed from stainless steel plates 4 which are bent inwards along their lower edge to form a turned-in lip 5. This lip 5 forms a support for the corresponding insert 2 which is a snug fit in its respective cell 3. As illustrated each cell unit 3 is square in plan. The units can, however, be of any suitable, preferably regular, plan shape that permits them to be packed in side by side. For example, instead of being square they could be triangular, rectangular, or hexagonal. Alternatively the units 3 may be of different shapes within a tray; for example, a combination of octagonal and square cells could be incorporated in the lattice, each octagonal cell having alternate sides abutting corresponding sides of another octagonal cell with the intervening sides abutting a side of a square cell. The plan shape of the cells is not critical provided that they can be packed in closely adjacent one another. Overall the tray is circular in plan so that it can be fitted in a conventional circular distillation column.

Each insert 2 has a perforate bottom 6 surrounded by upstanding walls 7 whose upper edges are outwardly turned to form an outwardly projecting lip 8. An outwardly flared skirt portion 9 is welded to the lower edge of walls 7 beneath the perforate bottom 6. Below the perforate bottom 6 of each insert 2 is mounted a downcomer pipe 10 (only the upper end of which is shown in FIG. 1); this is supported adjacent its closed upper end by means of four branch pipes 11, each mounted to a corresponding part of the skirt 9. The length of each downcomer 10 is so selected in relation to the vertical spacing between the individual trays of the distillation column that its lower end is positioned adjacent the bottom 6 of the corresponding insert 2 in the tray below. This can be seen from FIG. 1 in which the downcomer pipes 10' of the tray above tray 1 are shown in broken lines. If desired a quick release joint (not shown), for example a bayonet joint, may be provided in each downcomer pipe 10 close to and below its junction with the branch pipe 11. In this way the main part of downcomer pipe 10 can be removed to permit access to the inter-tray space for maintenance, inspection or repair purposes.

Adjacent the upper ends of walls 7 of each insert 2 there is provided a row of vertical slits 12.

Clips (not shown) may be provided to secure the inserts 2 within their individual cells 3.

In operation, liquid from the tray above passes down downcomers 10' to the cup formed by walls 7 and perforate bottom 6 and overflows therefrom through slits 12 into the cavity surrounding each cup between walls 7 and plates 4. From this cavity the liquid flows through branch pipes 11 into downcomer 10. The direction of liquid flow is indicated by arrows in FIG. 1. Vapour passes up the column through the perforations 13 (see FIG. 2) in the bottom 6 of each insert 2 and bubbles through the liquid in the cup of each insert 2. In this way good liquid/vapour contact occurs. As will be appreciated the cup of each insert 2 discharges into the cup of the corresponding insert of the tray below it without mingling with the liquid of adjacent inserts. Hence the distillation column of the illustrated embodiment can be likened to a plurality of small individual distillation columns each having a horizontal sectional area equivalent to one insert.

In the event that the distillation column tilts, as might occur for example if the column is part of a barge-mounted plant exposed to rough seas, the liquid seal on each tray will not be broken, despite the tray taking up a non-horizontal attitude, because the cup-like construction of the inserts 2 prevents the liquid surging to one side of the tray as the column tilts.

It will be appreciated by those skilled in the art that the size and number of the perforations 13 in the bottom 6 of each insert must be so selected in relation to the viscosity of the liquid at the operating temperature and the design throughput of vapour, amongst other factors, that a liquid body of adequate depth is maintained throughout operation on the perforate bottom 6 of the cup of each insert 2.

The materials of construction are not critical provided that they are not corroded by the liquid or vapour at design temperature in operation. Appropriate seals (not shown) may be provided as necessary (e.g. along each lip 5) in order that a suitable liquid seal can be maintained in each cell 3 in operation.

In FIG. 2 there are shown 30 cells 3, each with a corresponding insert 2 (typically about 100 mm×100 mm square). The precise number of cells in the lattice of the tray 1 will of course depend on the overall transverse dimensions of the column. The number of trays in, and the height of, the column will of course depend on the duty for which it is designed.

In an alternative construction (not illustrated), the bottom plate 6 of each insert 2 is replaced by a plate fitted with four nipples and bubble-caps disposed symmetrically about downcomer pipe 10'.

It is also possible to construct a distillation tray in accordance with the invention in which the bottom plate 6 of each insert is replaced by a plate fitted with a number of non-return valves, (e.g. 4 valves symmetrically disposed about downcomer pipe 10' of the type conventionally used in valve trays (or ballast trays).

It is claimed:

1. A distillation process which comprises:
providing a distillation tower having at least one distillation tray divided into a plurality of adjacent individual cup-like cavities, each cavity being adapted in use to receive a quantity of liquid and being defined by a substantially horizontally extending bottom portion provided with one or more apertures therein for upward passage of vapour therethrough and by peripheral wall means provided with at least one opening therethrough located at a pre-selected distance above the upper surface of the bottom portion thereby providing each said cavity with respective weir means at the periphery of said cavity and each cavity further being associated with respective downpipe means arranged to receive excess liquid overflowing the corresponding weir means from the cavity and to feed same to the tray below:
allowing liquid to flow into each cavity from the tray above so as to maintain a body of liquid therein;
passing vapour up the column through the aperture or apertures in the apertured bottom of each cavity into the body of liquid therein; and
allowing excess liquid to overflow from each cavity to a tray below.

2. A distillation column having two or more distillation trays at least one of which is provided with a plurality of cup-like cavities, each cavity being adapted in use to receive a quantity of liquid and being defined by a substantially horizontally extending bottom portion provided with one or more apertures therein for upward passage of vapour therethrough and by peripheral wall means provided with at least one opening therethrough located at a pre-selected distance above the upper surface of the bottom portion thereby providing each said cavity with respective weir means at the periphery of said cavity, and each cavity further being associated with respective downpipe means arranged to receive excess liquid overflowing the corresponding weir means from the cavity and to feed same to the tray below, whereby in use a body of liquid can be maintained in each cavity for contact with the upflowing vapour and for providing a liquid seal between stages despite tilting of the tray.

3. A distillation column having two or more distillation trays at least one of which comprises a lattice structure formed with an array of adjacent open-topped cells, each snugly receiving an insert comprising an apertured bottom having at least one aperture therethrough for upward passage of vapour, upstanding peripheral walls defining together with the bottom plate a cup-like cavity, at least one of the walls being provided with at least one opening therethrough at a pre-selected distance above the upper surface of the bottom plate thereby providing weir means for overflow of excess liquid from the cavity, and down pipe means mounted below the bottom plate for transferring liquid that has overflowed the weir means to the tray below.

4. A distribution tray provided with a plurality of cup-like cavities, each cavity being adapted in use to receive a quantity of liquid and being defined by a substantially horizontally extending bottom portion provided with one or more apertures therein for upward passage of vapour therethrough and by peripheral wall means provided with at least one opening therethrough located at a pre-selected distance above the upper surface of the bottom portion thereby providing each said cavity with respective weir means at the periphery of said cavity, and each cavity further being associated with respective downpipe means arranged to receive excess liquid overflowing the corresponding weir means from the cavity and the feed same to the tray below, whereby in use a body of liquid can be maintained in each cavity for contact with the upflowing vapour and for providing a liquid seal between stages despite tilting of the tray.

5. An insert for a distillation tray for a multi-tray distillation column comprising an apertured bottom plate having at least one aperture therethrough for upward passage of vapour, upstanding peripheral walls defining together with the bottom plate a cup-like cavity, at least one of the walls being provided with at least one opening therethrough at a pre-selected distance above the upper surface of the bottom plate thereby providing weir means for overflow of excess liquid from the cavity, and downpipe means mounted below the bottom plate for transferring liquid that has overflowed the weir means to the tray below.

6. An insert according to claim 5, in which the insert is provided with a dependent skirt portion below the bottom plate and has the downpipe means mounted thereto.

7. An insert according to claim 6, in which the skirt portion flares outwardly.

8. An insert according to claim 6, in which the downpipe means comprises a main vertical downpipe connected at or adjacent its upper end to one or more branch pipes mounted to the skirt portion.

9. An insert according to claim 5, in which the bottom plate is perforated and has a plurality of apertures therethrough.

10. An insert according to claim 5, in which the bottom plate is provided with one or more nipples and bubble-caps.

11. An insert according to claim 5, in which the bottom plate is provided one or more non-return valves.

12. A distillation tray comprising a lattice structure formed with an array of adjacent open-topped cells, snugly receiving an insert comprising an apertured bottom plate having at least one aperture therethrough for upward passage of vapour, upstanding peripheral walls defining together with the bottom plate a cup-like cavity, at least one of the walls being provided with at least one opening therethrough at a pre-selected distance above the upper surface of the bottom plate thereby providing weir means for overflow of excess liquid from the cavity, and downpipe means mounted below the bottom plate for transferring liquid that has overflowed the weir means to the tray below.

13. A distillation tray according to claim 12, in which each insert is provided with a dependent skirt portion below the bottom plate and has the downpipe means mounted thereto.

14. A distillation tray according to claim 13, in which the skirt portion flares outwardly.

15. A distillation tray according to claim 13, in which the downpipe means comprises a main vertical downpipe connected at or adjacent its upper end to one or more branch pipes mounted to the skirt portion.

16. A distillation tray according to claim 12, in which the bottom plate of each insert is perforated and has a plurality of apertures therethrough.

17. A distillation tray according to claim 12, in which the bottom plate of each insert is provided with one or more nipples and bubble-caps.

18. A distillation tray according to claim 12, in which the bottom plate of each insert is provided with one or more non-return valves.

19. A distillation tray according to claim 12, in which the cells of the lattice structure each have inwardly turned lip means at their lower ends for support of a corresponding insert.

* * * * *